(12) United States Patent
Nakagawa

(10) Patent No.: US 8,452,194 B2
(45) Date of Patent: May 28, 2013

(54) SYSTEM, IMAGE PROCESSING APPARATUS, IMAGE FORMING APPARATUS, AND METHOD THEREOF

(75) Inventor: Isamu Nakagawa, London (GB)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 12/909,681

(22) Filed: Oct. 21, 2010

(65) Prior Publication Data

US 2011/0129237 A1    Jun. 2, 2011

(30) Foreign Application Priority Data

Dec. 1, 2009    (JP) .................................. 2009-273884

(51) Int. Cl.
*G03G 15/00* (2006.01)

(52) U.S. Cl.
USPC ............... 399/8; 399/81; 358/1.13; 358/1.14; 358/1.15; 358/1.16; 358/1.18; 700/17; 709/219; 710/19

(58) Field of Classification Search
USPC ................. 399/8, 81; 358/1.13–1.18
See application file for complete search history.

(56) References Cited

U.S. PATENT DOCUMENTS

| | | | |
|---|---|---|---|
| 5,862,404 A | 1/1999 | Onaga | |
| 7,389,057 B2 * | 6/2008 | Yamaguchi et al. | 399/8 |
| 7,664,555 B2 * | 2/2010 | Kawai | 700/17 |
| 7,706,003 B2 * | 4/2010 | Uruma | 358/1.14 |
| 2005/0102379 A1 * | 5/2005 | Su et al. | 709/219 |
| 2005/0254829 A1 * | 11/2005 | Lee et al. | 399/8 |
| 2008/0071941 A1 * | 3/2008 | Imai et al. | 710/19 |
| 2008/0219681 A1 * | 9/2008 | Kim | 399/8 |
| 2010/0134828 A1 * | 6/2010 | Nishiyama | 358/1.15 |
| 2010/0309502 A1 * | 12/2010 | Ando et al. | 358/1.13 |

FOREIGN PATENT DOCUMENTS

| | | | |
|---|---|---|---|
| JP | 09305522 A | * | 11/1997 |
| JP | 11-039237 A | | 2/1999 |
| JP | 2004118295 A | * | 4/2004 |

* cited by examiner

*Primary Examiner* — David Gray
*Assistant Examiner* — Francis Gray
(74) *Attorney, Agent, or Firm* — Canon USA, Inc., IP Division

(57) ABSTRACT

A system having an image forming apparatus and an information processing apparatus includes setting whether the status of the image forming apparatus is immediately confirmed by a user, transmitting a file containing a status log based on the status change of the image forming apparatus from the image forming apparatus to an external file server, and displaying a list of the image forming apparatus to be contained in the system on a screen in the information processing apparatus, wherein with respect to the image forming apparatus as to which a setting is made to immediately confirm the status, a button to instruct confirmation of the status of the apparatus is displayed in the list, and wherein when an instruction to confirm the status is executed from the list, status of the image forming apparatus is displayed based on the status log to be contained in the file transmitted from the image forming apparatus.

9 Claims, 14 Drawing Sheets

FIG.6

STATUS DISPLAY — 601

| ID | DATE | | TYPE OF STATUS | MESSAGE |
|---|---|---|---|---|
| 101 | 2009/9/1 3:30 | ! | COVER OPEN | RIGHT COVER IS OPENED |
| 102 | 2009/9/2 8:30 | ⚠ | PAPER JAM | PAPER IS JAMMED |
| 103 | 2009/9/2 10:45 | ✖ | SERVICE CALL | SERVICE IS CALLED |
| 104 | 2009/9/3 14:30 | i | COVER OPEN | FRONT COVER IS OPENED |
| 105 | 2009/9/3 15:21 | ⚠ | PAPER JAM | PAPER IS JAMMED |

— 602

[ CLOSE ] — 603

DISPLAY OF STATUS LIST

DISPLAY CONTROL OF STATUS LIST (UPDATE)

FIG.10

MANAGEMENT PROGRAM UI

☑ PERIODICALLY STORE STATUS CHANGE OF DEVICE — 1001

| | | |
|---|---|---|
| STORED PLACE: | //file.server/folder/status | 1002 |
| USER NAME: | kosugi | 1003 |
| PASSWORD: | ****** | 1004 |
| STORED TIME: | 18:00 | 1005 |

☑ MAIL STATUS CHANGE OF DEVICE — 1006

| | | |
|---|---|---|
| MAIL SERVER ADDRESS: | smtp.mail.server | 1007 |
| TRANSMITTER MAIL ADDRESS: | aaa@inc.co.jp | 1008 |
| NOTIFICATION DESTINATION MAIL ADDRESS: | bbb@inc.co.jp | 1009 |

☑ IMMEDIATELY UPDATE LOG FILE WHEN STATUS OF DEVICE IS CHANGED — 1010

[GENERATE FILE EVERY DAY ▽] — 1011

| | | |
|---|---|---|
| STORAGE LOCATION: | //file.server/folder | 1012 |
| USER NAME: | kosugi | 1013 |
| PASSWORD: | ****** | 1014 |

☑ NOTIFY OF APPLICATION ERROR — 1015, 1016
    ☑ TIME MONITORING ERROR    ☑ FILE ACCESS ERROR

☑ NOTIFY OF STATUS CHANGE — 1017
    ☑ ALSO NOTIFY AT THE TIME OF RECOVERY FROM ERROR    ☑ SERVICE CALL
    ☑ PAPER SUPPLY RUNS OUT    ☑ COVER OPEN
    ☑ PAPER JAM    ☑ SHORTAGE OF TONER

1018

[ CLOSE ]

SYSTEM, IMAGE PROCESSING APPARATUS, IMAGE FORMING APPARATUS, AND METHOD THEREOF

BACKGROUND OF THE INVENTION

1. Field of the Invention

The present invention relates to a technique in a system to monitor an image forming apparatus.

2. Description of the Related Art

Conventionally, a system to collect and monitor information on an image forming apparatus such as a printer, a facsimile, and a multifunction peripheral has been discussed. The image forming apparatus to be monitored and a monitoring apparatus are connected to a network, and can mutually be in communication.

Further, in Japanese Patent Application Laid-Open No. 11-039237, status information on a job of peripheral equipment is stored in a file server and can be confirmed from a work station that is connected to a network. This reduces a communication load or the like that occurs by individually accessing the peripheral equipment on a network from a plurality of work stations on a network.

However, in a system to monitor an image forming apparatus which is an apparatus to be monitored, information other than the status of a job may also be monitored. For example, status information on an obstacle such as a jam and an error is monitored. Thus, different types of contents of the status information are present to be monitored. Accordingly, the status information on the image forming apparatus is needed to be transmitted to the outside from the image forming apparatus at suitable timing and in an output form as intended by a manager intends so as to be managed by a system. Further, in a case in which many image forming apparatuses are contained in a system and a manager manages these apparatuses, an image forming apparatus which is to confirm the status on a high priority is present. In such a case, it is needed that a manager can flexibly make a particular setting on only several image forming apparatuses for efficient management. With respect to Japanese Patent Application Laid-Open No. 11-039237, when status information is transmitted to a file server from the apparatus to be monitored, this kind of procedures is not considered. Thus, this point is an issue.

SUMMARY OF THE INVENTION

The present invention is directed to a system including an image forming apparatus, which provides a manager who manages these apparatuses with a structure for flexible management.

According to an aspect of the present invention, a system having an image forming apparatus and an information processing apparatus includes a setting unit configured to set whether the status of the image forming apparatus is immediately confirmed by a user, a transmission unit configured to transmit a file containing a status log based on the status change of the image forming apparatus to the outside from the image forming apparatus, and a display control unit configured to display a list of the image forming apparatus to be contained in the system on a screen in the information processing apparatus, wherein the image forming apparatus transmits one file collecting the status log recorded at a specified period or a file generated for each recorded status log, wherein with respect to the image forming apparatus as to which a setting is made by the setting unit that the status is immediately confirmed an instruction to confirm the status of the apparatus is displayed in the list, and wherein when an instruction to confirm the status of the image forming apparatus is executed from the list, the display control unit executes status display of the image forming apparatus based on the status log to be contained in the file transmitted from the image forming apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates a display example of a status list.

FIG. 10 illustrates an example of a setting user interface (UI) to be provided by a management program.

DESCRIPTION OF THE EMBODIMENTS

Various exemplary embodiments, features, and aspects of the invention will be described in detail below with reference to the drawings.

Figure 1:
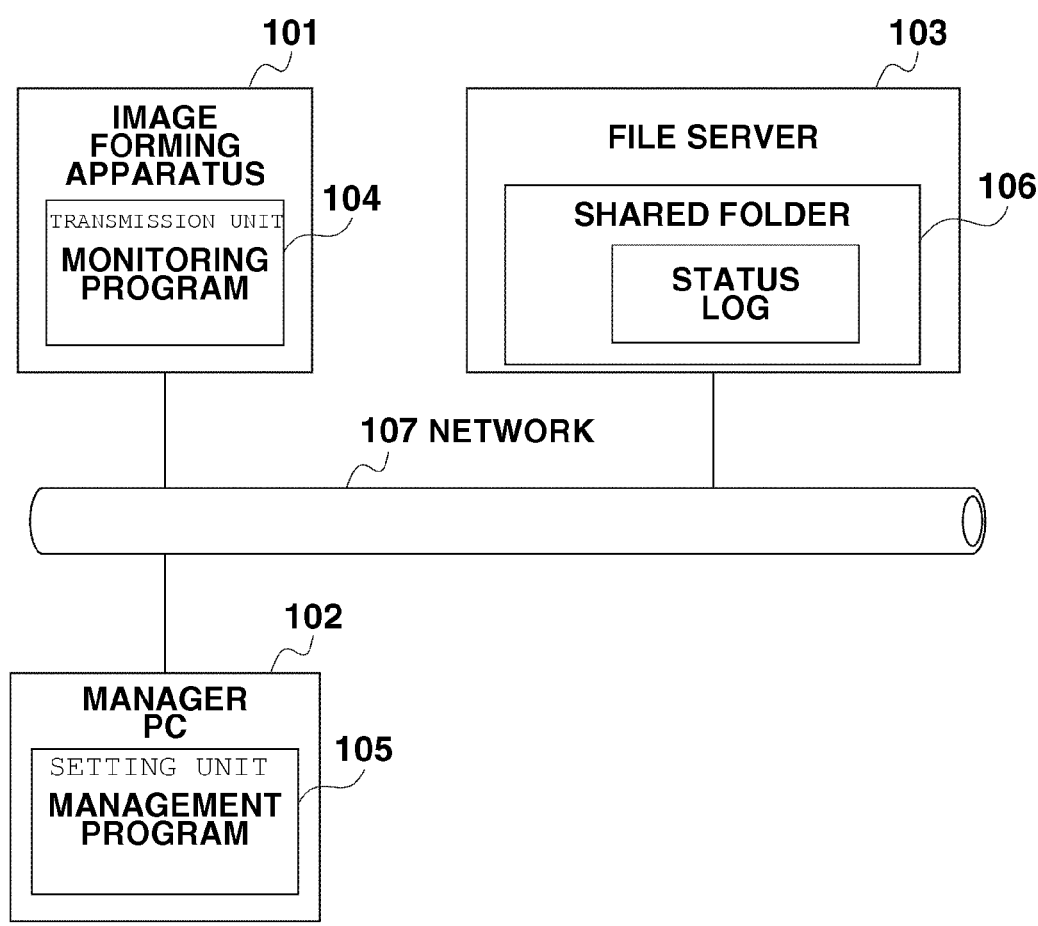
FIG. 1 illustrates an arrangement of a system on a network according to the present invention.

FIG. 1 is a block diagram illustrating the configuration of the whole computer monitoring system according to the present exemplary embodiment.

FIG. 1 includes an image forming apparatus 101, a personal computer (PC) 102 for a manager, and a file server 103. These are communicably connected via a network 107. On the image forming apparatus 101, a monitoring program 104 is operated. When there is a change in status of the own apparatus, the image forming apparatus 101 records the change. The image forming apparatus 101 executes processing to write a status log into the file server 103. On the PC 102, a management program 105 for monitoring and managing an image forming apparatus on a network is operated. For the file server 103, a shared folder 106 is prepared. The monitoring program 104 and the management program 105 execute writing and reading of status logs as a file. Further, also in a case where a plurality of image forming apparatuses is present on a network, the present invention can be applied, which will be described below.

Figure 2:
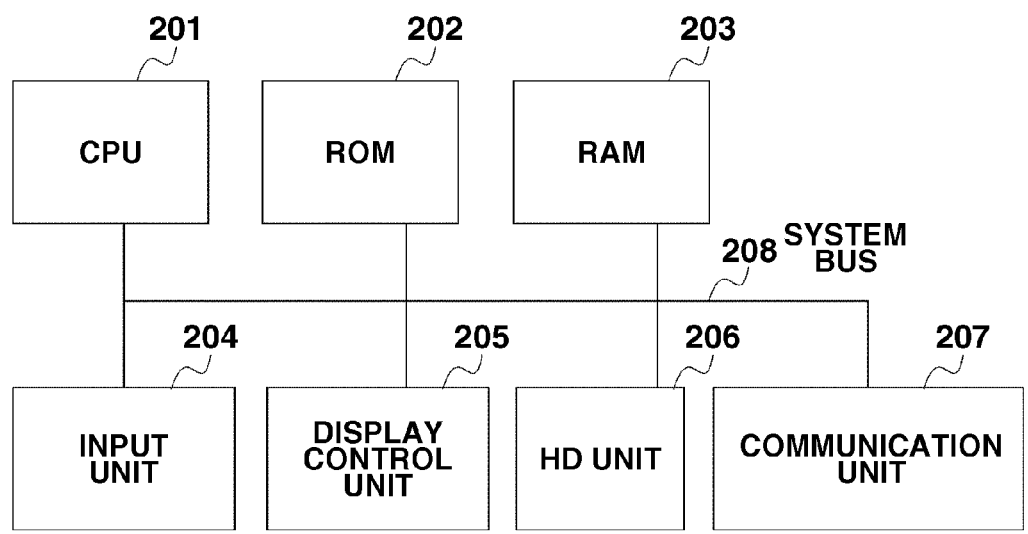
FIG. 2 illustrates the configuration of an image processing apparatus such as a personal computer (PC) and a file server.

FIG. 2 is a block diagram illustrating the hardware configuration of an information processing apparatus such as the PC 102. In FIG. 2, a central processing unit (CPU) 201 executes control, calculation processing, and the like for the whole computer system. A read only memory (ROM) 202 is a storage area of information such as a system startup program. A random access memory (RAM) 203 is a data storage area, which can store without restriction of use. The RAM 203 is an area into which programs of an operating system (OS), an application, an image forming apparatus driver, and communication control are loaded. The RAM 203 is an area where the programs are executed. An input unit 204 transmits data input by a keyboard, a mouse, or the like to a CPU as data. A display control unit 205 executes display control over a display device such as a cathode ray tube (CRT). A hard disk (HD) unit 206 is an external storage device, and stores programs and various types of data. The programs and various types of data are referred to or loaded into a RAM at the time of execution if needed. A communication unit 207 executes network communication control. As illustrated in FIG. 1, the communication unit 207 can communicate with other computers and peripheral equipment connected to a network. A system bus 208 is a data path between the above-described components.

Figure 3:
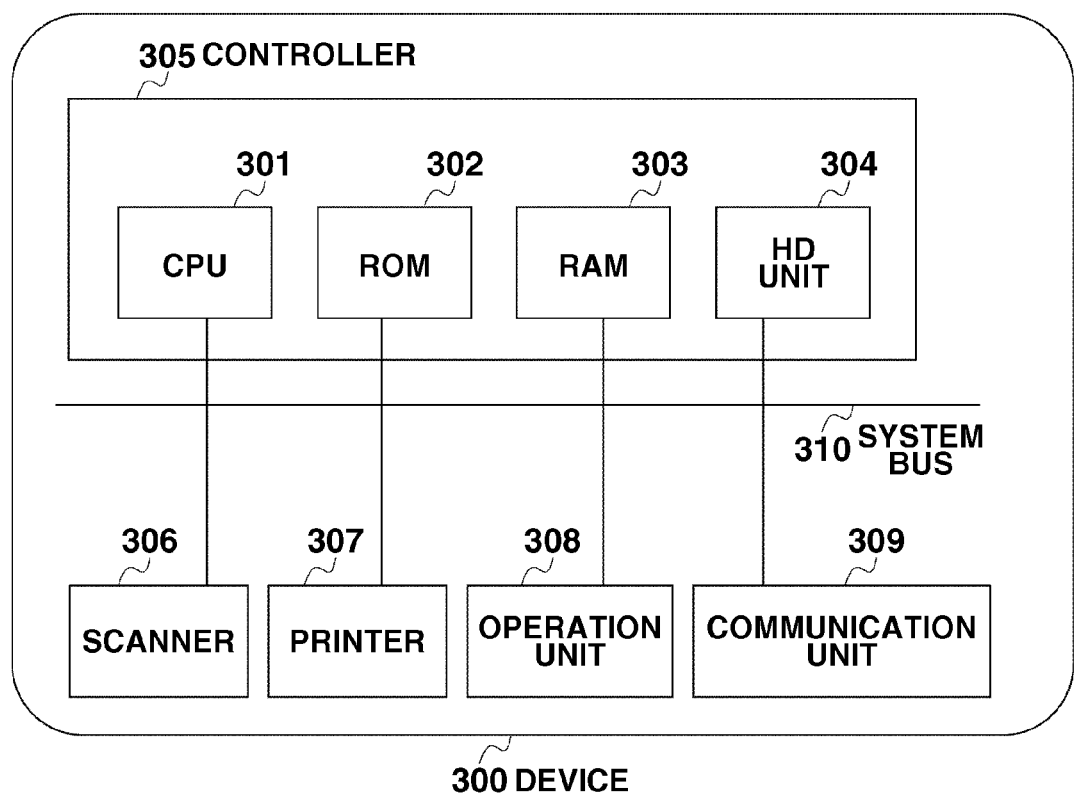
FIG. 3 illustrates the configuration of an image forming apparatus.

FIG. 3 is a block diagram illustrating the hardware configuration of the image forming apparatus 101. In the present exemplary embodiment, as an image forming apparatus, a printer, a multifunction peripheral including a plurality of functions (print function, scan function, and the like), and the like can be applied. In the present exemplary embodiment, the configuration of the multifunction peripheral is described as an example.

A controller unit 305 controls the entire image forming apparatus 300. The internal configuration of the controller is a CPU 301, which executes control over the controller, calculation processing, and the like. A ROM 302 is a storage area of information such as a system startup program. A RAM 303 is a data storage area, which can store without restriction of use. A HD unit 304 is a nonvolatile storage device such as a hard disk or a static random access memory (SRAM). The RAM 303 is an area into which programs of an OS, communication control, engine control, and the like are loaded. The RAM 303 is an area where the programs are executed and data is stored. A scanner 306 executes an image reading operation. A printer 307 executes a printing operation under control of the controller. An operation unit 308 receives instructions from a user and executes display. A communication unit 309 executes network communication control. The communication unit 309 can communicate with other image forming apparatuses and computers. A system bus 310 is a data path between the above-described components.

Figure 4:
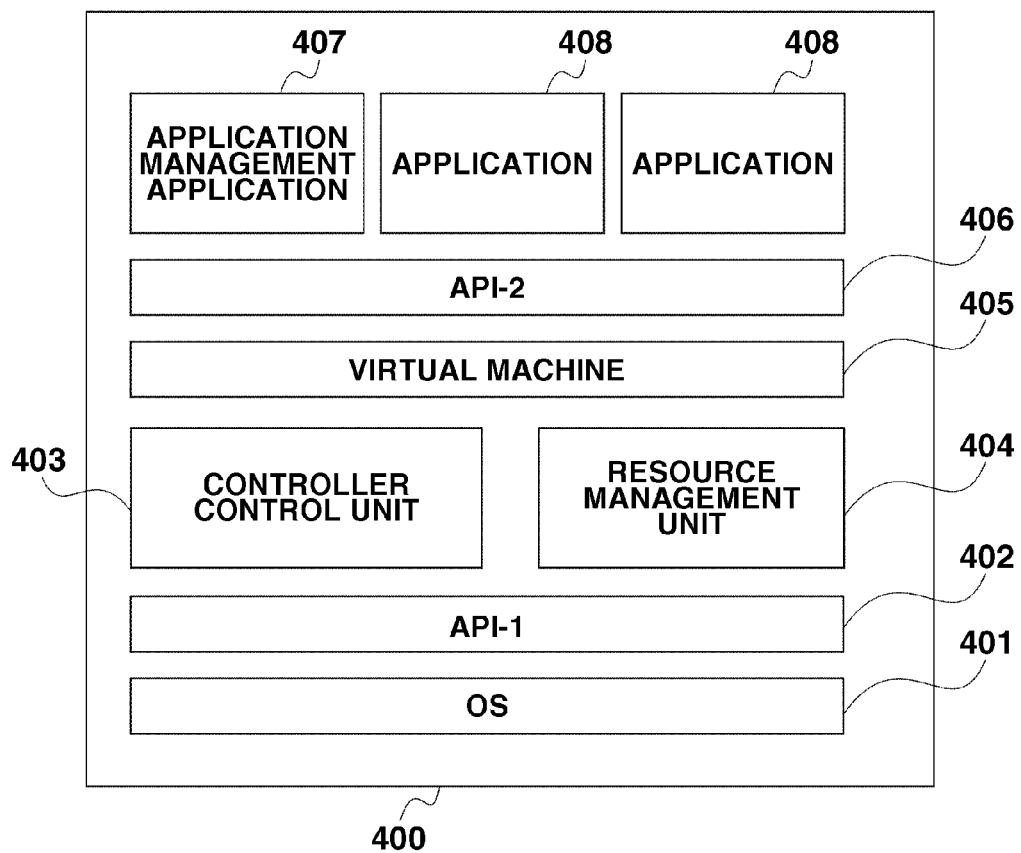
FIG. 4 illustrates the software configuration of an image forming apparatus.

FIG. 4 illustrates the software configuration of the image forming apparatus 101 according to the present invention. This software is stored in the ROM 302 or the HD unit 304, loaded into the RAM 303 when the image forming apparatus is started up, and executed.

An OS 401 manages/controls the resource of the entire image forming apparatus. An application interface (API) 402 is an interface for applications to be operated on the OS 401. The application can access the resource on the image forming apparatus via the API 402 or a CPU can execute a command thereof. A controller 403 is operated on the OS 401. The controller 403 controls the scanner 306, the printer 307, the operation unit 308, and the like. A resource control unit 404 restricts use of the resource which is equal to or larger than the predetermined amount when the controller 403 and all applications on a virtual machine 405 which will be described below use the resource such as a memory. The virtual machine 405 is the most suitable execution environment to execute a particular application. The most suitable execution environment can be realized by, for example, a virtual machine of Java (registered trademark of Sun Microsystems, Inc. in US). An API 406 is an interface in which an application to be operated on the virtual machine 405 uses the controller control unit 403, the resource control unit 404, the API 402, and the like. An application management application 407 manages applications to be operated on the virtual machine 405. The application management application 407 executes download, upload, deletion, and of enabling and disabling of applications which will be described below. An application 408 is one of applications to be operated on the virtual machine 405. An arbitrary number of applications having an optional function can be installed in the image forming apparatus and operated on the image forming apparatus corresponding to a role to be expected. The above-described monitoring program 104 can also be operated as the application 408.

Next, processing of the management program 105 in the present exemplary embodiment will be described. The management program 105 is recorded on the HD unit 206, read into the RAM 203, and executed by the CPU 201.

Figure 5:
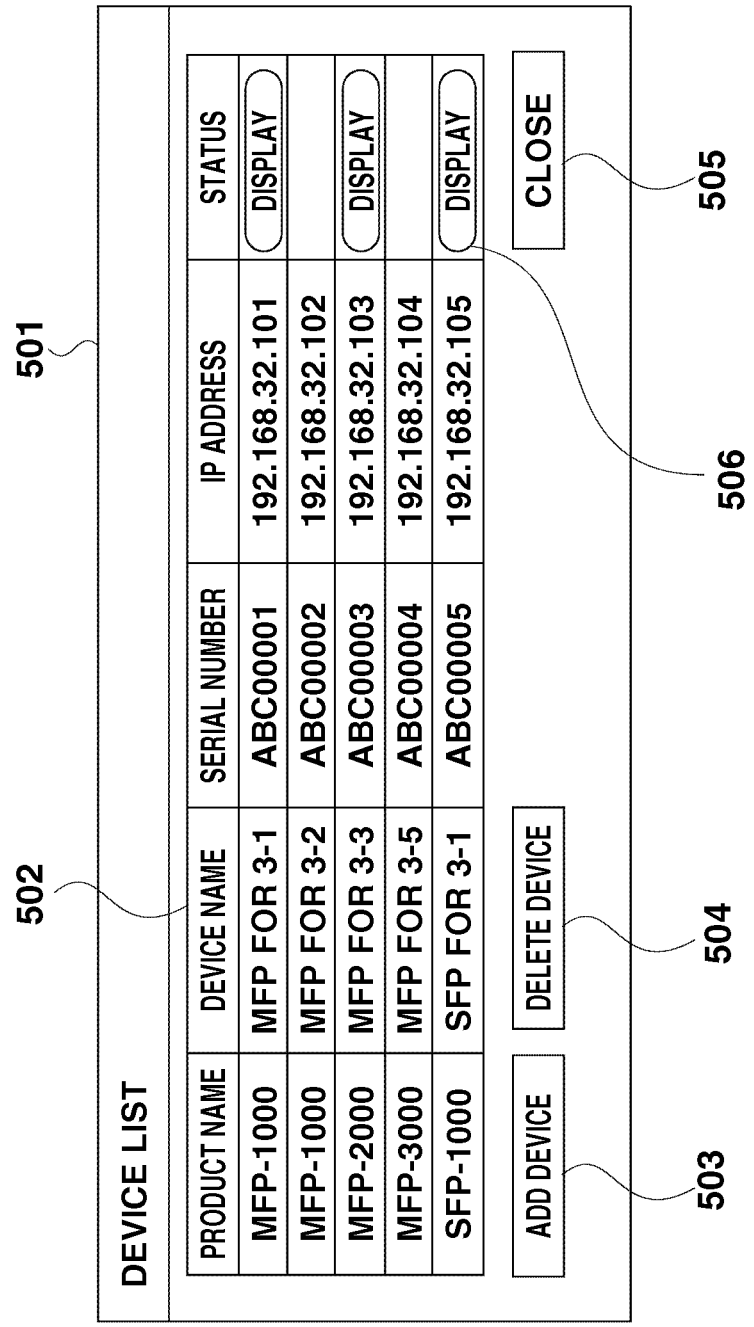
FIG. 5 illustrates a display example of a device list.

FIG. 5 illustrates an example of a dialog screen 501 to be displayed when the management program 105 is started up on the PC 102.

A device list 502 displays an image forming apparatus to be managed. As illustrated in FIG. 5, the device list 502 is in a table form which contains product name/device name/serial number/internet protocol (IP) address/display button of status as a column. Product name indicates the type (model) of products. Device name is a name that a user can optionally attach to an individual image forming apparatus. Serial number is a number that can uniquely specify an individual image forming apparatus respectively. IP address is information to be set in order to make it unique on a network. In the status column, "display" button is displayed when a status list, which will be described later, can be displayed corresponding to the setting of an image forming apparatus.

A button 503 is a button to add an image forming apparatus. The button 503 newly adds an image forming apparatus to the device list 502 based on information for specifying an image forming apparatus such as an IP address. When an image forming apparatus is newly added, the PC 102 on which the management program 105 is operated communicates with the image forming apparatus on which the monitoring program 104 is operated. A pass of the shared folder 106, authentication information for access, and the like are acquired from the image forming apparatus. Then, the image forming apparatus is managed by the management program 105. A button 504 deletes an image forming apparatus selected in the device list 502. A button 505 is a button to close a window in the device list table 501. A button 506 is a button to display status. This button is displayed only when the setting of an image forming apparatus satisfies some conditions. A procedure to determine whether to display will be described below.

FIG. 6 illustrates a status display screen 601 which appears when an instruction to press the status display button 506 in FIG. 5 is issued by a user.

A status list 602 is generated based on a status log. The status list 602 is generated (updated) by the processing in FIG. 7 which will be described below. Each line of the status list 602 is one status log, which constitutes a table having a column containing identification (ID) that is an identification number for each log, date of log generation, an icon simply displaying urgency of status, the type of status, and a message for each log. A button 603 is a button to close this screen.

A procedure to display the status list 602 of the management program 105 to be operated on the PC 102 will be described referring to a flowchart in FIG. 7. Each procedure performed by the management program 105 which will be described in FIG. 7 is realized by reading a program into the RAM 203 to cause the CPU 201 to execute the program.

Figure 7A:
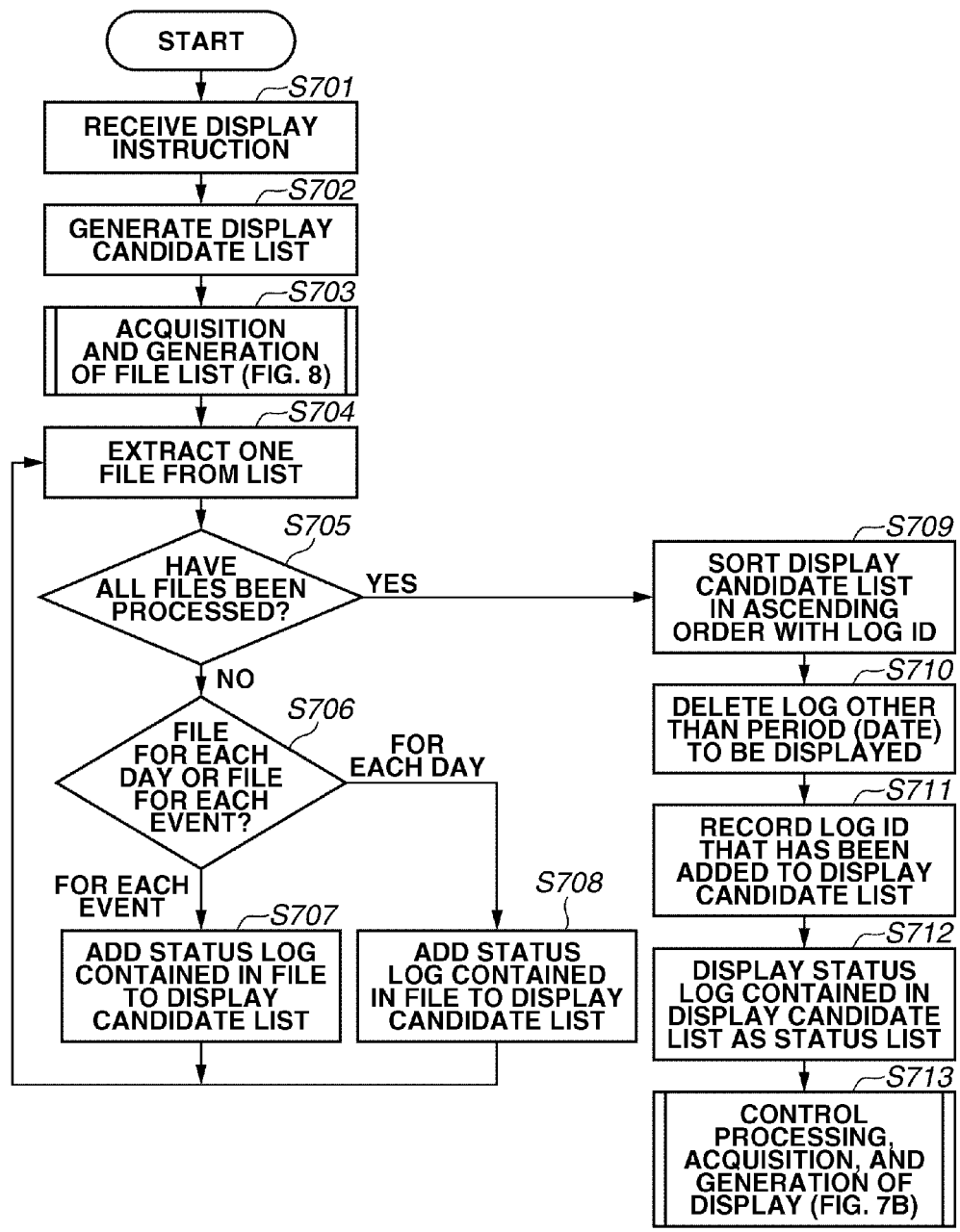
FIGS. 7A and 7B are flowcharts illustrating a procedure according to a management program to be operated on a PC.

First, FIG. 7A illustrates a flowchart to describe generation and display processing of a status list when the instruction to press the button 506 in FIG. 5 is issued by a user.

In step S701, an instruction of status display based on press of the button 506 in FIG. 5 is received. In a series of processing for status display in FIG. 6, which is described hereafter, an image forming apparatus instructed to display the status in FIG. 5 is referred to as a target image forming apparatus. In step S702, a display candidate list that temporarily stores a status log which is to be displayed is generated.

In step S703, a file list of a shared folder that stores a status log as a file is acquired. This processing will be described below referring to FIG. 8.

In step S704, one file is extracted from the file list. In step S705, when a file is not extracted in step S704, the processing proceeds to step S709 considering that all files in the file list have been processed (YES in step S705). When a file is extracted, the processing proceeds to step S706. In step S706, it is determined whether the extracted file is a file for each day in FIG. 12A or a file for each event in FIG. 12B. If the file is for each event, the processing proceeds to step S707. If the file is for each day, the processing proceeds to step S708. Determination in step S706 may also be executed based on information, for example, whether date of every one day is provided or a serial number of an event is provided as a file name. As another determination method, date or contents of a log may also be identified from information recorded in the file to make a determination.

Figure 12A:
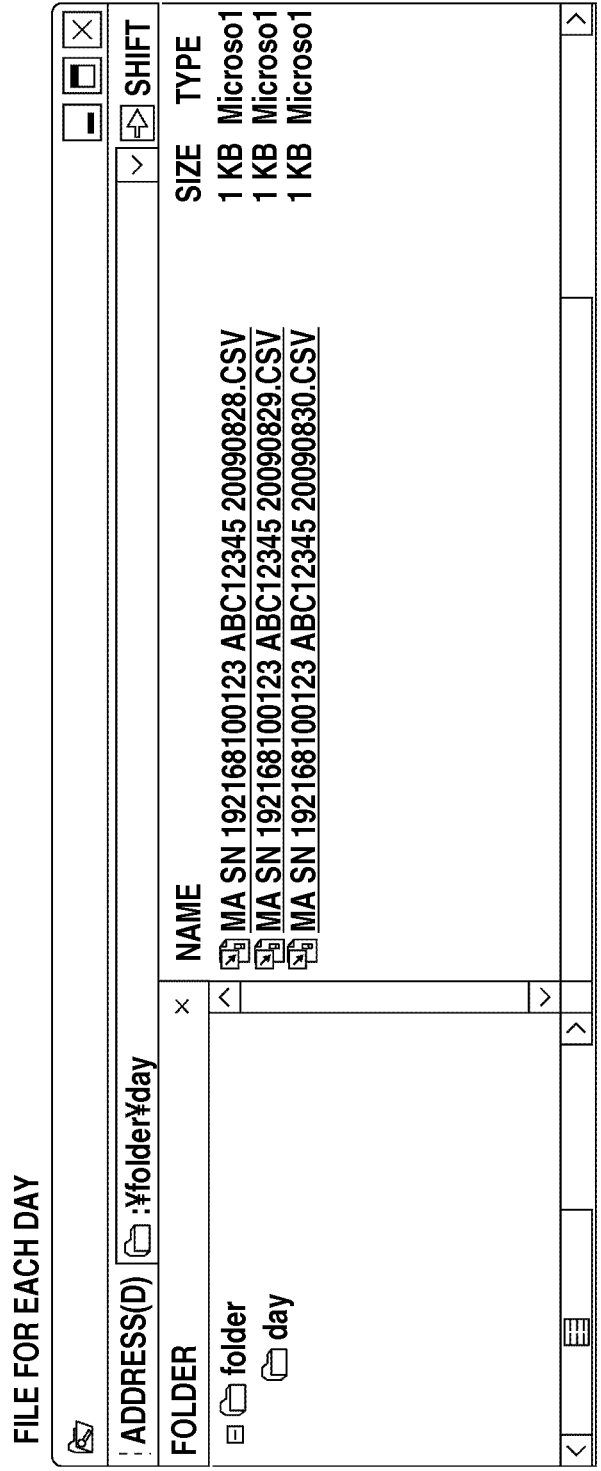
FIGS. 12A and 12B illustrate examples of a status log to be managed by a file server as a file.
Figure 12B:
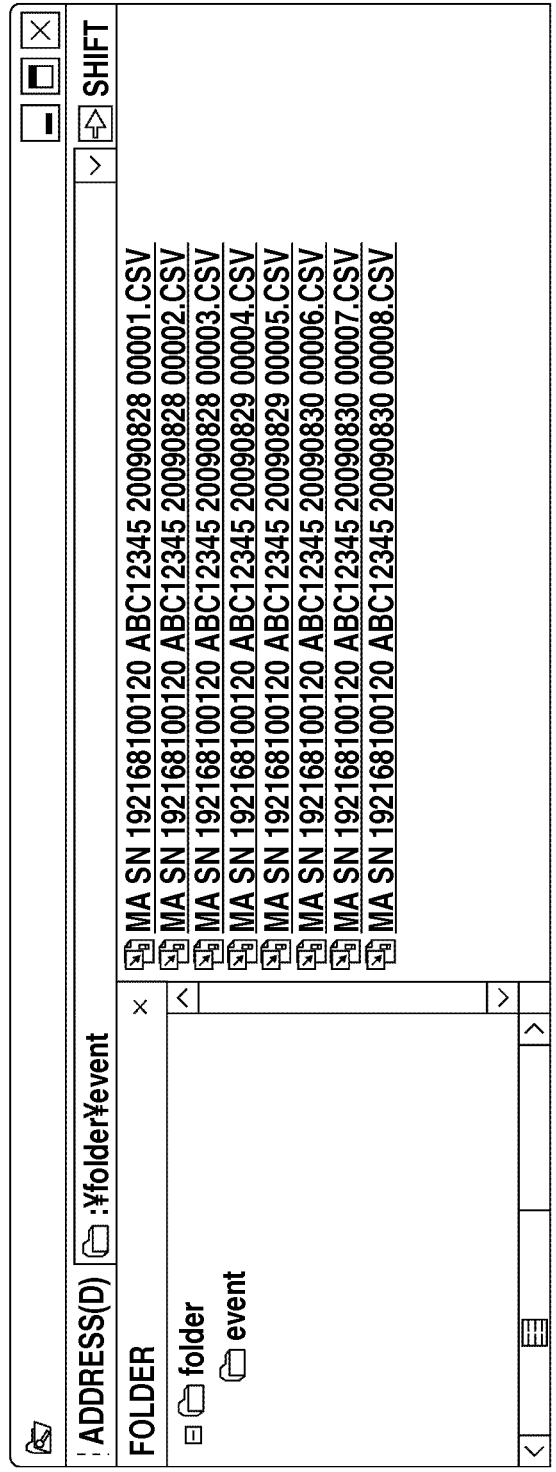

A file for each day and a file for each event that are managed by a shared folder on the file server 103 will be described. The file for each day illustrated in FIG. 12A is status logs that indicate event information about a breakdown or the like that occurs in a day in an image forming apparatus, put together in one file. File name includes information on device name and date. In the present exemplary embodiment, an example status logs are stored in a file server as a file for each day, in every predetermined number of days (every one day. However, status logs may also be recorded as a file in every arbitrary period of time such as every predetermined hour or month that is instructed by a manager. The file for each event illustrated in FIG. 12B is one status log that indicates the information is generated as one file whenever an event such a breakdown of an image forming apparatus occurs. The image forming apparatus may also be stored in a shared folder when a file is generated or may also be stored collecting several files. File name includes information on device name, serial numbers of date and events of occurrence, and like.

In step S707, the status log to be contained in the file is added to a display candidate list. Then, the processing returns to step S704. In step S708, the file for each day is read and the status log to be contained in the file is added to the display candidate list. Then, the processing returns to step S704.

In step S709, the display candidate list is sorted in ascending order with a log ID key. In step S710, a status log other than a period of time (e.g., for the past seven days) to be displayed and set by a manager is deleted. In step S711, log ID to be contained in the display candidate list is recorded as displayed log ID. In the present exemplary embodiment, for example, the largest log ID is recorded as displayed ID and is used in processing in step S729 which will be described below. In step S712, using the display candidate list edited up to here, the status list 602 as illustrated in FIG. 6 is displayed. Thereafter, in step S713, in order to execute control such as display update, the processing proceeds to processing illustrated in FIG. 7B.

Figure 7B:
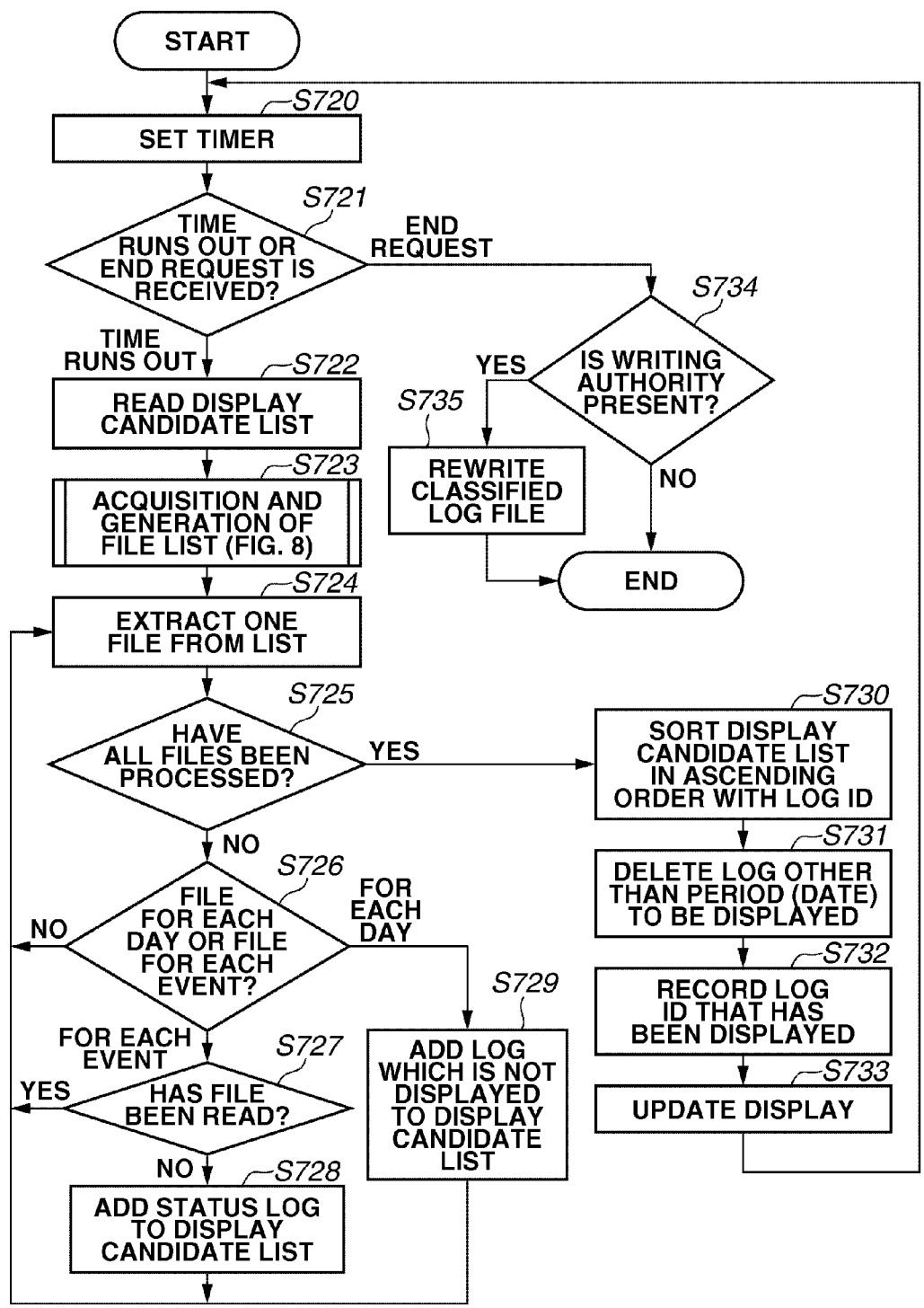

FIG. 7B illustrates a flowchart to describe processing until press of the button 603 to close is instructed by a user after display of the status list in FIG. 6.

In step S720, a timer is set. Thereafter, this processing is periodically called from the OS. In step S721, it is determined whether the timer set in step S720 runs out or an end request instructed by press of the button 603 for closing is received. If the end request is received in step S721, status display in FIG. 6 ends. Then, the processing proceeds to step S734. If time runs out in step S721, the processing proceeds to step S722. In step S722, in order to display the current status, the display candidate list generated in FIG. 7A is read. In the following processing, a new status log is added to the read display candidate list. Thus, display is updated. However, in addition to this, a candidate list for updating display is newly generated to be merged. Thus, the display in FIG. 6 may be updated.

In step S723, a file list of a shared folder that stores a status log as a file is obtained. This processing will be described below referring to FIG. 8.

In step S724, one file is extracted from the file list. When a file is not extracted in step S724, the processing proceeds to step S730 as in step S725, all files in the file list have been processed. When a file is extracted, the processing proceeds to step S726. In step S726, it is determined whether the extracted file is a file for each day in FIG. 12A or a file for each event in FIG. 12B. If the file is for each event, the processing proceeds to step S727. If the file is for each day, the processing proceeds to step S729.

In step S727, it is determined whether the file has been read. If it has been read (YES in step S727), the processing proceeds to step S724. If it has not been read (NO in step S727), the processing proceeds to step S728. A status log to be contained in the file is added to the display candidate list. Thereafter, the processing returns to step S724. In step S729, a file for each day is read and a status log having a log ID coming after a log ID of the status log that has been stored in the file and displayed is added to the display candidate list. Thereafter, the processing returns to step S724.

In step S730, the display candidate list is sorted in ascending order with the log ID key. In step S731, a status log other than a period of time (e.g., for the past seven days) to be displayed and set by a manager is deleted. In step S732, the log ID to be contained in the display candidate list is recorded as displayed log ID. In the present exemplary embodiment, for example, the largest log ID is recorded as the displayed ID and is used in the processing in step S729. In step S733, using the display candidate list edited up to here, display is updated so that a new status log is added to and displayed on the status list 602 that is displayed in FIG. 6. Then, the processing returns to step S720.

In step S734, it is confirmed whether the management program 105 has the authority to write into a folder on a file server on which a status log is placed. If the writing authority is present (YES in step S734), the processing proceeds to step S735. If the writing authority is not present (NO in step S734), the processing ends. In step S735, when the file is managed as a file for each event, using the generated display candidate list, the file is reconstructed as a file for each day. This step has the purpose of reducing the number of files in the folder. However, it is not essential processing. When a manager intends to continuously confirm the number of files of a shared folder on the file server 103 to recognize the status of an image forming apparatus or the like, naturally, the processing in step S735 is not necessary.

Figure 8:
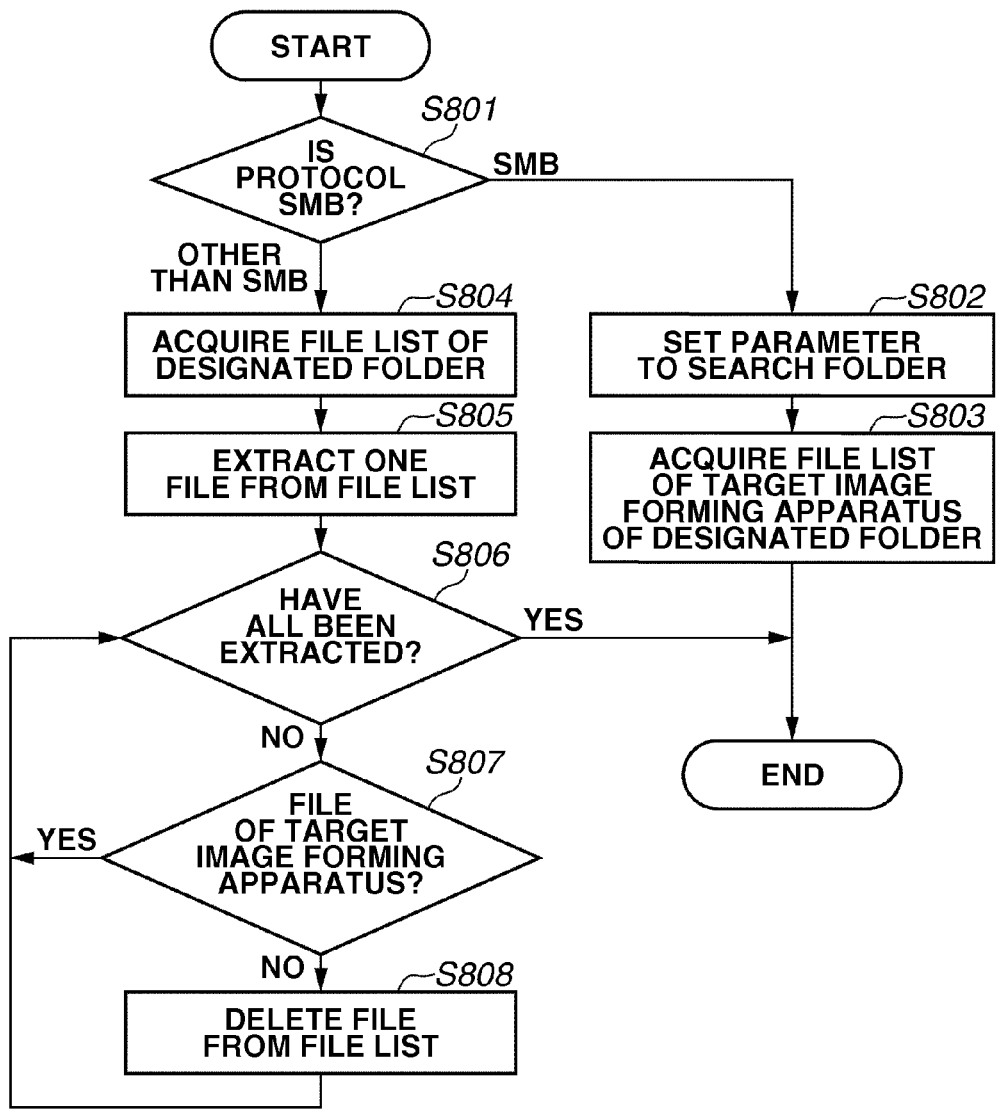
FIG. 8 illustrates a flowchart for acquiring a file list.

The detail of a procedure in step S704 illustrated in FIG. 7 will be described referring to a flowchart in FIG. 8.

In step S801, it is determined whether a network protocol when the PC 102 acquires a file from the file server 103 is SMB or other protocol. If it is SMB in step S801, the processing proceeds to step S802. If it is not SMB in step S801, the processing proceeds to step S804. SMB is an abbreviation of Server Message Block and a protocol to be used in implementation of a shared folder or a shared printer in Windows (registered trademark) OS of Microsoft Corporation in US. In SMB, when a file list is obtained from a folder, a search condition can be designated. In other protocols, it may not be designated.

In step S802, a search parameter is set. In step S803, a parameter in step S802 is provided and a designated file to be placed on a designated folder is obtained. In step S803, only a file that contains a status log of a target image forming apparatus is listed and acquired.

In step S804, a file list that contains all files of the designated folder is acquired. In step S805, one file is extracted from the file list acquired in step S804. In step S806, it is determined whether all files have already been extracted in step S805. If all files have been extracted (YES in step S806), the processing ends. If a file is extracted (NO in step S806), the processing proceeds to step S807. In step S807, it is determined whether it is a file which records a status log of a target image forming apparatus. Otherwise (NO in step S807), the subject file is deleted from the file list in step S808. As a determination method in step S807, a determination may also be made by embedding specific information on the image forming apparatus (device name etc.) in a file name. Further, it may also be determined by embedding specific information on the image forming apparatus (device name etc.) in a file.

Figure 9:
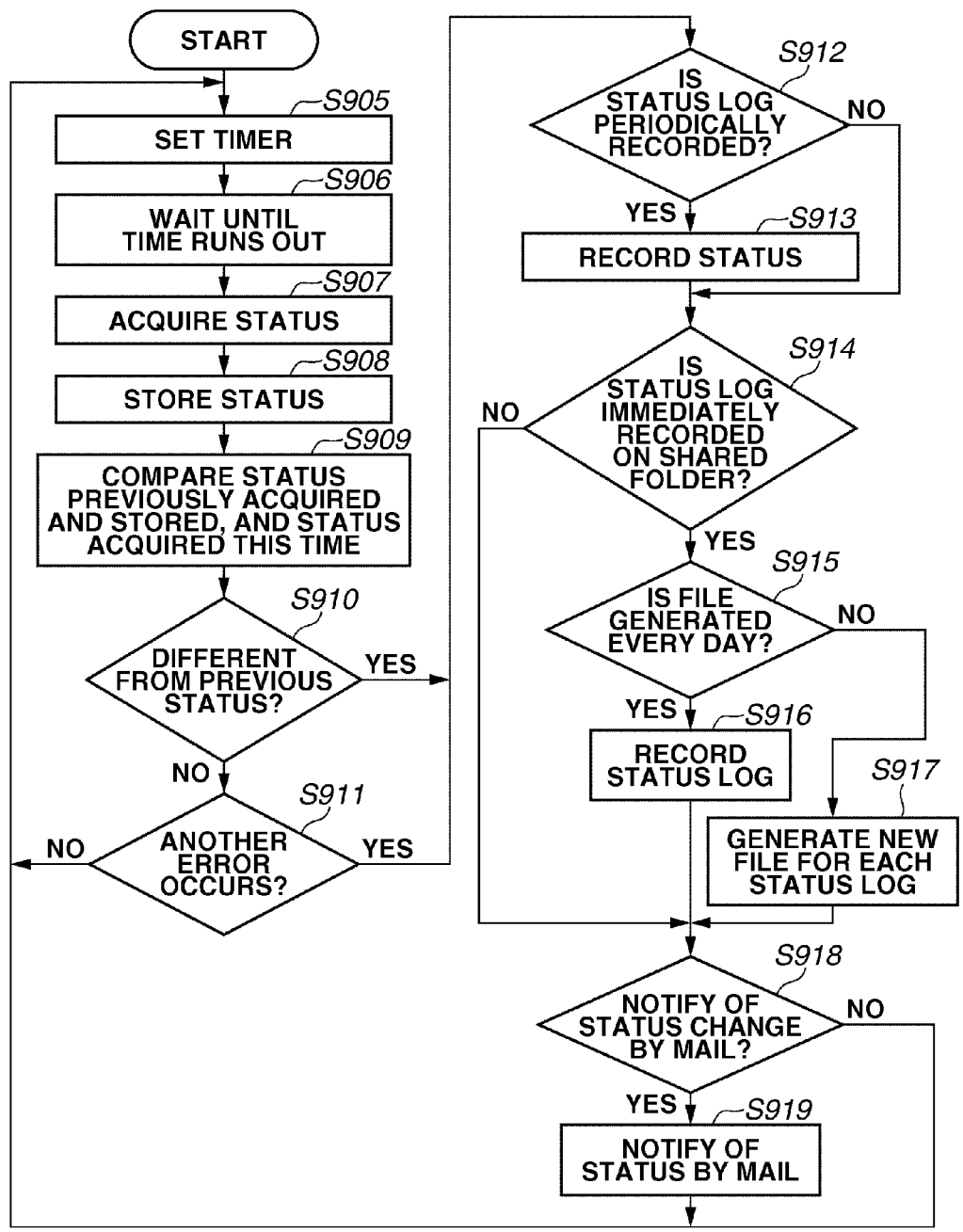
FIG. 9 is a flowchart illustrating a procedure according to a monitoring program to be operated on an image forming apparatus.

Referring to a flowchart in FIG. 9, a processing procedure of the monitoring program 104 to be operated on the image forming apparatus 101 will be described. This processing will execute an operation corresponding to a setting input via a setting user interface (UI) illustrated in FIG. 10 which will be described in detail below. Further, this processing continues monitoring corresponding to the setting in FIG. 10. This processing will end when an instruction to stop monitoring processing is received from a manager or the like. Each procedure by the management program 104 which is described in FIG. 9 is realized by reading a program into the RAM 303 to cause the CPU 301 to execute the program.

In step S905, a timer is set. In step S906, the processing waits until time runs out. If time runs out, the processing proceeds to step S907. Then, the status and various set values of the image forming apparatus are acquired. In step S908, values of the status and the like acquired in step S907 are stored in the RAM 303 or the HD unit 304. In step S909, the status and the set value acquired in step S907, and the status and the set value previously acquired and stored are compared. If the result of comparison in step S908 is the same (NO in step S910), the processing proceeds to step S911. If the result of comparison in step S908 is different (YES in step S910), the processing proceeds to step S912. In step S911, it is determined whether another error occurs. In step S911, another error is an error concerning a function other than this monitoring function which is provided by an application. For example, when the application has the function of recording the history of a job to be executed on the printer unit 307, the error includes an error concerning the processing. More specifically, another error to be targeted in this step includes all errors other than that which is obtained by status information acquired from equipment.

In step S912, it is determined whether a setting is to periodically store a status log in a file server. If it is the case (YES in step S912), the processing proceeds to step S913. Otherwise (NO in step S912), the processing proceeds to step S914. The setting in step S912 is made referring to the setting via the setting UI in FIG. 10. In step S913, the status information acquired in step S907 is recorded on the HD unit 304 as a status log.

In step S914, it is determined whether a setting is made to immediately store a status log in a shared folder on a file server. If it is the case (YES in step S914), the processing proceeds to step S915. Otherwise (NO in step S914), the processing proceeds to step S917. The setting in step S914 is made referring to the setting via the setting UI in FIG. 10. In step S915, the storage setting of a status log whether a file of a status log is to be generated every one day or for every change in status is determined. In step S915, the setting via the setting UI in FIG. 10 is referred to. If it is generated every one day (YES in step S915), the processing proceeds to step S916. If it is generated for every change in status (NO in step S915), the processing proceeds to step S917. In step S916, a status log is recorded (or add record) on a file of a day when status information is acquired. In step S916, as a file name, a file containing a four digit numeral value that indicates the Christian Era, a two digit numeral value that indicates month, and a two digit numeral value that indicates day is generated. In step S917, a new file is generated and recorded for each status log. In step S917, as a file name, a serial number to uniquely identify the date and the status log is contained. The contents of a file for recording a status log in steps S916 and S917 include the date and time, identification information on image forming apparatus, IP addresses, codes that indicate status and character strings of the codes, error types, identification numbers of status logs, and the like. Identification numbers are serial numbers which are increased one by one whenever one status log is output.

In step S918, it is determined whether a setting is made to notify the detected status change by mail. If it is the case (YES in step S918), the processing proceeds to step S919. Otherwise (NO in step S918), the processing returns to step S905. In step S919, a status log is transmitted by mail.

FIG. 10 illustrates an example of a setting UI to be used when a monitoring setting is executed to the monitoring program 104. This screen is displayed when accessing the monitoring program 104 from the management program 105 that is operated on the PC 102. Hypertext Transfer Protocol (HTTP) is implemented on the monitoring program 104. Thus, even in WEB browser, setting processing via the similar screen can be executed.

On check box 1001, a user designates whether the status change of an apparatus is periodically stored. On check box 1002, the user designates a storage destination. On check box 1002, for example, the user designates a server and a pass. On check boxes 1003 and 1004, the user designates a user name and a password to access check box 1002. On check box 1005, the user designates a time to be stored. On check box 1005, since the storage is made once a day, only a time is designated. However, a setting item that designate particular day of the week or time can also be prepared.

On check box 1006, the user designates whether to notify the status change of an apparatus by mail. On check box 1007, the user designates an address of a mail server. On check boxes 1008 and 1009, the user designates a transmitter and a notification destination when mail on check box 1007 is transmitted.

On check box 1010, the user designates whether a log file is immediately updated when the status of an apparatus is changed. On check box 1011, the user designates whether a file of a log file is generated every one day in FIG. 12A or a file is generated for every change in status in FIG. 12B. On check box 1012, the user designates a server and a pass to be a storage destination. On check boxes 1013 and 1014, the user designates a user name and a password to access the storage destination (file server).

On check box 1015, the user designates whether to notify errors of applications. On a plurality of check boxes 1016, the user can designate an error to be notified. The user designates whether to notify a status change on check box 1017. On a plurality of check boxes 1018, the user can designate a status change to be notified.

Figure 11:
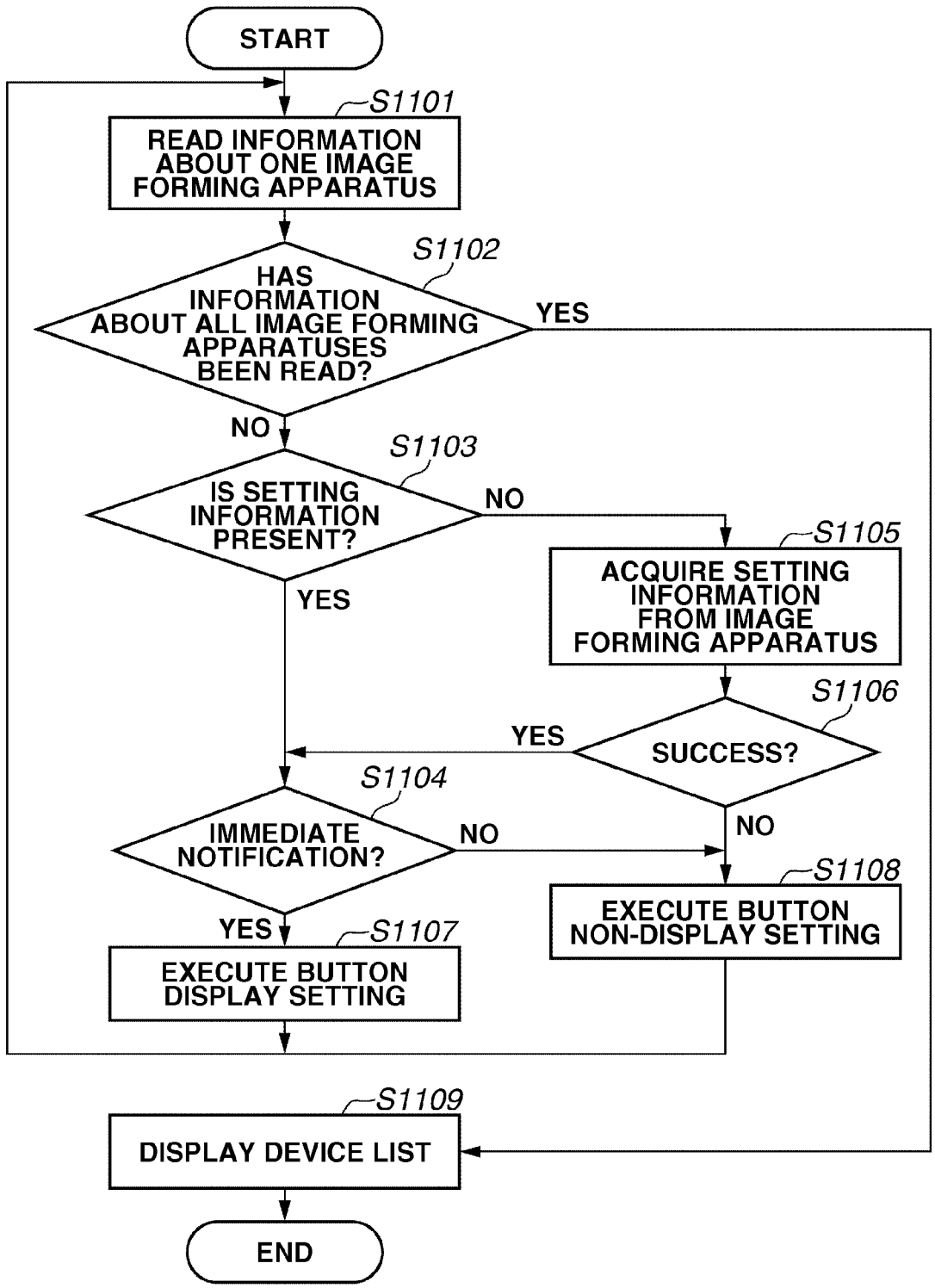
FIG. 11 is a flowchart illustrating a procedure according to a management program to be operated on a PC.

A procedure for displaying a dialog in FIG. 5 of the management program 105 to be operated on the PC 102 will be described. Each procedure by the management program 105 that is described in FIG. 11 is realized by reading a program into the RAM 203 to cause the CPU 301 to execute the program.

In step S1101, information on one image forming apparatus is read from a file of a device list in which an image forming apparatus to be managed by the management program 105 is contained. The management program 105 stores information on the image forming apparatus, which is displayed at that time by itself, as a device list file when a program ends. In step S1102, it is determined whether all of information are read in step S1101. If all are read, the processing proceeds to step S1109. Otherwise, the processing proceeds to step S1103.

In step S1103, it is determined whether setting information concerning a status log is contained in information on the image forming apparatus read in step S1101. If it is contained (YES in step S1103), the processing proceeds to step S1104. This setting information includes location information about a folder (pass etc.) in which a status log is stored as a file, authentication information for logging in the folder (user name and password), a setting whether to immediately notify a status log, and the like. If it is determined that the setting information is not contained (NO in step S1103), the processing proceeds to step S1105. Then, the setting information to be managed by the monitoring program 104 on the image forming apparatus is acquired. If acquisition processing in step S1105 succeeds (YES in step S1106), the processing proceeds to step S1104. If it fails (NO in step S1106), the processing proceeds to step S1108.

In step S1104, it is determined whether a setting by the setting information is immediate notification. Immediate notification is a setting to immediately write a status log on a shared folder on a file server as a file when the management program 104 detects a status change. If it is immediate notification (YES in step S1104), the processing proceeds to step S1107. Otherwise (NO in step S1104), the processing proceeds to step S1108. In step S1107, with respect to information on the image forming apparatus read in step S1101, it is determined to display the display button 506 and store it. In step S1108, the display button 506 is not displayed.

In step S1109, display control illustrated in FIG. 5 is executed based on the file of the device list. In step S1109, referring to settings in steps S1107 and S1108, display/non-display of the button 506 is determined.

As described above, in the present exemplary embodiment, when the device list is displayed by the PC 102, a button for status display using a status log is prepared only for the image forming apparatus to which immediate notification of an event is set. With respect to an image forming apparatus as to which a manager particularly intends to swiftly recognize a status change, detail status information can simply be provided. As a result, when a plurality of image forming apparatuses is present in a system, more efficient equipment management complying with an intension of the manager will be performed.

Other Embodiments

The present invention can also be realized by executing the following process. That is, a process in which a software (program) that realizes the functions of the above-described embodiments is supplied to the system or apparatus via a network or a recording medium of various types, and then a computer of the system or apparatus (or devices such as CPU or MPU) reads out the program and executes it. In such a case, the recording medium where the program is stored as well as the program are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-273884 filed Dec. 1, 2009, which is hereby incorporated by reference herein in its entirety.

What is claimed is:

1. A system including an image forming apparatus and an information processing apparatus, the system comprising:
a setting unit configured to set whether a status of the image forming apparatus is immediately confirmed by a user;
a transmission unit configured to transmit a file containing a status log based on a status change of the image forming apparatus, to an outside from the image forming apparatus, wherein the image forming apparatus transmits one file collecting the status log recorded at a specified period or a file generated for each recorded status log; and
a display control unit configured to display a list of the image forming apparatus to be contained in the system on a screen in the information processing apparatus,
wherein with respect to the image forming apparatus as to which a setting is made by the setting unit that the status is immediately confirmed, an instruction button to confirm the status of the image forming apparatus is displayed in the list,
wherein with respect to the image forming apparatus as to which a setting is not made by the setting unit that the status is immediately confirmed or with respect to the image forming apparatus as to which an acquisition of a setting by the setting unit has failed, the instruction button is not displayed in the list and
wherein when the instruction button is executed from the list, the display control unit executes status display of the image forming apparatus based on the status log to be contained in the file transmitted from the image forming apparatus.

2. The system according to claim 1, wherein the display control unit executes similar status display either when a file transmitted from the image forming apparatus is stored in a form of one file collecting the status log recorded in a specified period or when a file is stored in a form of a file generated for each recorded status log.

3. A method in a system including an image forming apparatus and an information processing apparatus, the method comprising:

setting whether a status of the image forming apparatus is immediately confirmed by a user;

transmitting a file containing a status log based on a status change of the image forming apparatus, to an outside from the image forming apparatus, wherein the image forming apparatus transmits one file collecting the status log recorded at a specified period or a file generated for each recorded status log; and displaying a list of the image forming apparatus to be contained in the system on a screen in the information processing apparatus, wherein with respect to the image forming apparatus as to which a setting is made by the setting step that the status is immediately confirmed, an instruction button to confirm the status of the image forming apparatus is displayed in the list, wherein with respect to the image forming apparatus as to which a setting is not made by the setting step that the status is immediately confirmed or with respect to the image forming apparatus as to which an acquisition of a setting by the setting step has failed, the instruction button is not displayed in the list and wherein when the instruction button is executed from the list, the displaying step executes status display of the image forming apparatus based on the status log to be contained in the file transmitted from the image forming apparatus.

4. An information processing apparatus for managing an image forming apparatus comprising:

a setting unit configured to set whether a status of the image forming apparatus is immediately confirmed by a user; and a display control unit configured to display a list of the image forming apparatus on a screen, wherein with respect to the image forming apparatus as to which a setting is made by the setting unit that the status is immediately confirmed, an instruction button to confirm the status of the image forming apparatus is displayed in the list, wherein with respect to the image forming apparatus as to which a setting is not made by the setting unit that the status is immediately confirmed or with respect to the image forming apparatus as to which an acquisition of a setting by the setting unit has failed, the instruction button is not displayed in the list, and wherein when the instruction button is executed from the list, the display control unit executes status display of the image forming apparatus based on the status log to be contained in the file transmitted to the outside from the image forming apparatus.

5. The information processing apparatus according to claim 4, wherein one file collecting the status log recorded at a specified period or a file generated for each recorded status log is generated in the image forming apparatus, and wherein the display control unit executes similar status display either when a file is stored in a form of one file collecting the status log recorded at a specified period or when a file is stored in a form of a file generated for each recorded status log.

6. The information processing apparatus according to claim 4, wherein the setting unit can set whether the image forming apparatus notifies the status of the own apparatus by mail.

7. The information processing apparatus according to claim 4, wherein the setting unit can set the type of a status change to be recorded by the image forming apparatus as a status log.

8. A method in an information processing apparatus for managing an image forming apparatus, the method comprising:

setting whether a status of the image forming apparatus is immediately confirmed by a user; and display control to display a list of the image forming apparatus on a screen, wherein with respect to the image forming apparatus as to which a setting is made by the setting step that the status is immediately confirmed, an instruction button to confirm the status of the image forming apparatus is displayed in the list, wherein with respect to the image forming apparatus as to which a setting is not made by the setting step that the status is immediately confirmed or with respect to the image forming apparatus as to which an acquisition of a setting by the setting step has failed, the instruction button is not displayed in the list, and wherein when the instruction button is executed from the list, status of the image forming apparatus is displayed based on the status log to be contained in the file transmitted to the outside from the image forming apparatus in the display control.

9. A non-transitory computer readable storage medium on which is stored a computer program for making a computer execute a method for managing an image forming apparatus, the method comprising the steps of:

setting whether a status of the image forming apparatus is immediately confirmed by a user; and display control to display a list of the image forming apparatus on a screen, wherein with respect to the image forming apparatus as to which a setting is made by the setting step that the status is immediately confirmed, an instruction button to confirm the status of the image forming apparatus is displayed in the list, wherein with respect to the image forming apparatus as to which a setting is not made by the setting step that the status is immediately confirmed or with respect to the image forming apparatus as to which an acquisition of a setting by the setting step has failed, the instruction button is not displayed in the list, and wherein when the instruction button is executed from the list, status of the image forming apparatus is displayed based on the status log to be contained in the file transmitted to the outside from the image forming apparatus in the display control.

* * * * *